(12) United States Patent
Cao

(10) Patent No.: US 11,995,271 B2
(45) Date of Patent: May 28, 2024

(54) INTERACTIVE OBJECT SELECTION METHOD AND DEVICE

(71) Applicant: SHANGHAI HODE INFORMATION TECHNOLOGY CO., LTD., Shanghai (CN)

(72) Inventor: Xiang Cao, Shanghai (CN)

(73) Assignee: SHANGHAI HODE INFORMATION TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 18/036,366

(22) PCT Filed: Sep. 24, 2021

(86) PCT No.: PCT/CN2021/120373
§ 371 (c)(1),
(2) Date: May 10, 2023

(87) PCT Pub. No.: WO2022/105423
PCT Pub. Date: May 27, 2022

(65) Prior Publication Data
US 2023/0400970 A1    Dec. 14, 2023

(30) Foreign Application Priority Data
Nov. 18, 2020 (CN) .......................... 202011295354.5

(51) Int. Cl.
*G06F 3/041* (2006.01)
*G06F 3/04842* (2022.01)
(Continued)

(52) U.S. Cl.
CPC ........ *G06F 3/04186* (2019.05); *G06F 3/0418* (2013.01); *G06F 3/04842* (2013.01); *G06F 3/0488* (2013.01); *G06F 3/04883* (2013.01)

(58) Field of Classification Search
CPC ............ G06F 3/04186; G06F 3/04842; G06F 3/0418; G06F 3/0488; G06F 3/04883
See application file for complete search history.

(56) References Cited

U.S. PATENT DOCUMENTS 9,280,234 B1 * 3/2016 Froment ................. G06F 3/041
11,782,548 B1 * 10/2023 Wang .................... G06F 3/0488
345/173

(Continued)

FOREIGN PATENT DOCUMENTS

| CN | 103513914 A | 1/2014 |
| CN | 103677568 A | 3/2014 |

(Continued)

OTHER PUBLICATIONS

International Patent Application No. PCT/CN2021/120373; Int'l Search Report; dated Nov. 29, 2021; 2 pages.

*Primary Examiner* — Asher D Kells
(74) *Attorney, Agent, or Firm* — BakerHostetler

(57) ABSTRACT

The present application provides techniques of selecting interactive objects The techniques comprise receiving a touch operation intended for a target interactive object, and determining a touch position of the touch operation; detecting a moving direction of the touch operation in response to determining that the touch position is located in a buffer area preset for the target interactive object; and determining to select the target interactive object in response to determining that the moving direction points toward a body area preset for the target interactive object.

20 Claims, 7 Drawing Sheets

(51) Int. Cl.
    *G06F 3/0488*     (2022.01)
    *G06F 3/04883*     (2022.01)

(56) References Cited

U.S. PATENT DOCUMENTS

| | | | |
|---|---|---|---|
| 2009/0077501 A1* | 3/2009 | Partridge | G06F 3/048 |
| | | | 715/846 |
| 2011/0037727 A1* | 2/2011 | Lee | G06F 3/04166 |
| | | | 345/174 |
| 2012/0274592 A1* | 11/2012 | Duncan | G06F 3/0488 |
| | | | 345/173 |
| 2013/0111400 A1 | 5/2013 | Miwa | |
| 2013/0167084 A1* | 6/2013 | Miyake | G06F 3/04883 |
| | | | 715/810 |
| 2015/0268744 A1* | 9/2015 | Au | G06F 3/041 |
| | | | 345/173 |
| 2016/0117092 A1 | 4/2016 | Wang et al. | |
| 2016/0378293 A1* | 12/2016 | Sirpal | H04N 5/77 |
| | | | 715/863 |
| 2017/0139556 A1* | 5/2017 | Josephson | H04L 12/2803 |
| 2018/0210640 A1* | 7/2018 | Vijay Kumar | G06F 3/04883 |
| 2023/0024225 A1* | 1/2023 | Zambetti | G06F 3/0362 |

FOREIGN PATENT DOCUMENTS

| | | |
|---|---|---|
| CN | 103997668 A | 8/2014 |
| CN | 108932100 A | 12/2018 |
| CN | 110633023 A | 12/2019 |
| CN | 112433661 A | 3/2021 |
| WO | WO-2011094281 A1 * | 8/2011 ........... G06F 3/0488 |

* cited by examiner

INTERACTIVE OBJECT SELECTION METHOD AND DEVICE

CROSS-REFERENCE TO RELATED APPLICATION

The present application is the U.S. National Stage of International Application No. PCT/CN2021/120373, filed on Sep. 24, 2021, which claims priority to Chinese Patent Application No. 202011295354.5, filed with the China National Intellectual Property Administration on Nov. 18, 2020, and entitled "INTERACTIVE OBJECT SELECTION METHOD AND APPARATUS", both of which are incorporated herein by reference in their entireties.

TECHNICAL FIELD

Embodiments of the present application relate to the field of computer technologies, and in particular, to an interactive object selection method. One or more embodiments of the present application further relate to an interactive object selection apparatus, a computing device, a computer-readable storage medium, and a computer program product.

BACKGROUND ART

With rapid development of computer technologies, a user may interact with a terminal device through a graphical user interface, to select an interactive object displayed in the graphical user interface for subsequent interactive operations. There may often be a plurality of interactive objects in a graphical user interface, from which the user may select an interactive object for operations.

In the prior art, when there are a plurality of interactive objects in a graphical user interface, which interactive object to select is usually determined directly depending on which interactive object a point of input, such as a mouse or a finger, of a user falls on.

However, in the case of a plurality of densely arranged interactive objects and/or some extremely small interactive objects, if a user wants to select an interactive object, the user needs to control a point of input to fall exactly on the interactive object, which results in a great difficulty in selecting an interactive object and easily leads to accidental touch. Then, an easier and more accurate method is needed for an operation or processing for selecting an interactive object.

SUMMARY OF THE INVENTION

In view of this, embodiments of the present application provide an interactive object selection method. One or more embodiments of the present application further relate to an interactive object selection apparatus, a computing device, a computer-readable storage medium, and a computer program product, so as to solve the technical defects in the prior art.

According to a first aspect of an embodiment of the present application, there is provided an interactive object selection method, the method including:
  receiving a touch operation for a target interactive object, and determining a touch position of the touch operation;
  detecting a moving direction of the touch operation when it is determined that the touch position is located in a buffer area preset for the target interactive object; and
  determining to select the target interactive object when the moving direction points toward a body area preset for the target interactive object.

According to a second aspect of an embodiment of the present application, there is provided an interactive object selection apparatus, the apparatus including:
  a receiving module configured to receive a touch operation for a target interactive object, and determine a touch position of the touch operation;
  a first detection module configured to detect a moving direction of the touch operation when it is determined that the touch position is located in a buffer area preset for the target interactive object; and
  a first determination module configured to determine to select the target interactive object when the moving direction points toward a body area preset for the target interactive object.

According to a third aspect of an embodiment of the present application, there is provided a computing device, including:
  a memory and a processor,
  where the memory is configured to store computer-executable instructions, and the processor is configured to execute the computer-executable instructions to implement the steps of the interactive object selection method.

According to a fourth aspect of an embodiment of the present application, there is provided a computer-readable storage medium storing computer-executable instructions, where when the instructions are executed by a processor, the steps of the interactive object selection method are implemented.

According to a fifth aspect of an embodiment of the present application, there is provided a computer program product that, when executed in a computer, causes the computer to execute the steps of any of the foregoing interactive object selection methods.

By means of the interactive object selection method provided in the embodiment of the present application, a touch operation for a target interactive object can be received, and a touch position of the touch operation can be determined; then, a moving direction of the touch operation can be detected when it is determined that the touch position is located in a buffer area preset for the target interactive object; and it can be determined to select the target interactive object when the moving direction points toward a body area preset for the target interactive object. In this case, the buffer area and the body area are preset for the target interactive object, and if the touch operation falls into the buffer area of the target interactive object, it can be further determined whether to select the target interactive object based on the moving direction of the touch operation. As such, when a user wants to select a target interactive object, the user simply needs to control a touch operation to fall into a buffer area of the target interactive object, not exactly on the target interactive object, and to move toward a body area of the target interactive object, which reduces a requirement for position precision of the touch operation and thus a difficulty in selecting an interactive object, thereby allowing the user to more conveniently select an interactive object without accidental touch.

DETAILED DESCRIPTION OF EMBODIMENTS

In the following description, numerous specific details are set forth to provide a thorough understanding of the present application. However, the present application can be implemented in numerous other ways different from those described herein, and those skilled in the art can make similar extensions without departing from the essence of the present application. Therefore, the present application is not limited by the specific implementations disclosed below.

Terms used in one or more embodiments of the present application are merely for the purpose of describing specific embodiments, and are not intended to limit one or more embodiments of the present application. The terms "a/an", "said", and "the" in the singular form used in one or more embodiments of the present application and the appended claims are also intended to include the plural form, unless otherwise clearly indicated in the context. It should also be understood that the term "and/or" used in one or more embodiments of the present application refers to and includes any or all possible combinations of one or more of the associated listed items.

It should be understood that although the terms "first", "second", etc. may be used in one or more embodiments of the present application to describe various information, the information should not be limited to these terms. These terms are merely used to distinguish the same type of information from one another. For example, without departing from the scope of one or more embodiments of the present application, "first" may also be referred to as "second", and similarly, "second" may also be referred to as "first". Depending on the context, the word "if" as used herein may be interpreted as "when" or "upon" or "in response to determining".

First, the terms used in one or more embodiments of the present application are explained.

Interactive object: any object in a graphical user interface that can be selected, dragged, etc. by a user with a mouse, a finger, etc., such as a control, or graphics, text, etc. that can be used as a control.

The present application provides an interactive object selection method, and further relates to an interactive object selection apparatus, a computing device, a computer-readable storage medium, and a computer program product, which are described in detail one by one in the following embodiments.

Figure 1:
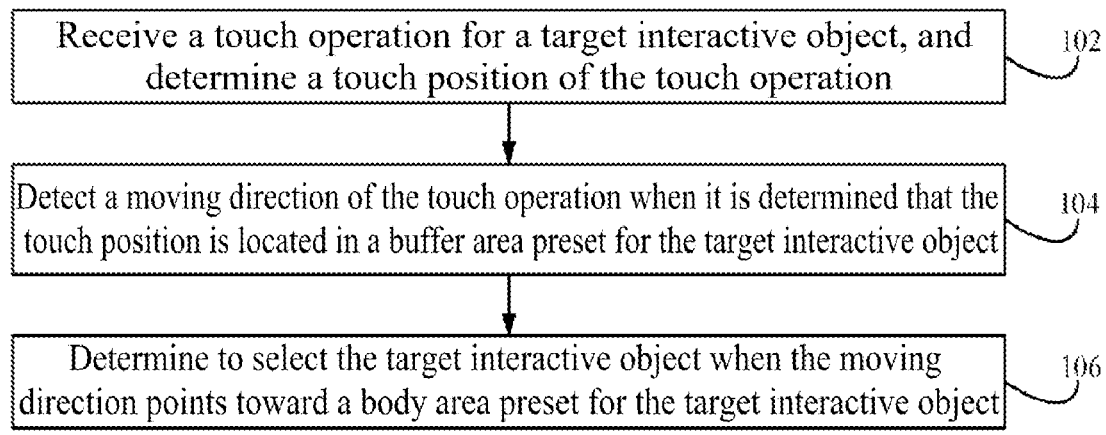
FIG. 1 is a flowchart of an interactive object selection method according to an embodiment of the present application.

FIG. 1 is a flowchart of an interactive object selection method according to an embodiment of the present application. As shown in FIG. 1, the method specifically includes the following steps.

Step 102: A touch operation intended for a target interactive object is received, and a touch position of the touch operation is determined.

In practical applications, there may be a plurality of interactive objects in a graphical user interface. At present, the selection of an interactive object usually depends on a position of a touch operation. In the case of a plurality of densely arranged interactive objects and/or some extremely small interactive objects, if a user wants to select an interactive object, the user needs to control a touch operation to fall exactly on the interactive object, which results in a great difficulty in selecting an interactive object and easily leads to accidental touch. Such a problem is exacerbated especially when the touch operation is performed on a touch screen with a finger, due to inaccurate locating by the finger itself and a possibility of blocking the interactive object by the finger.

Therefore, in order to reduce the requirement for position precision of the touch operation so that a user selects an interactive object more conveniently and accurately, the present application provides an interactive object selection method. In the method, a touch operation for a target interactive object can be received, and a touch position of the touch operation can be determined; then, a moving direction of the touch operation can be detected when it is determined that the touch position is located in a buffer area preset for the target interactive object; and it can be determined to select the target interactive object when the moving direction points toward a body area preset for the target interactive object. As such, when a user wants to select a target interactive object, the user simply needs to control a touch operation to fall into a buffer area of the target interactive object, not exactly on the target interactive object, and to move toward a body area of the target interactive object.

Specifically, the target interactive object is any of interactive objects displayed on a graphical user interface of a terminal device. The touch operation refers to a selection operation for the target interactive object, which may be an operation triggered by the user on the graphical user interface of the terminal device with a finger, a mouse, etc. for selecting or operating the target interactive object. The touch position of the touch operation refers to a touch point of the touch operation on the graphical user interface, that is, a point of input.

It should be noted that when a user wants to select an interactive object, the user may click on the interactive object with a mouse or a finger, and then, a terminal device may receive a touch operation for the interactive object. Then, a touch position of the touch operation may be further determined to facilitate further determination of whether the user wants to select the interactive object based on the touch position.

Further, before selecting or operating an interactive object, a buffer area, a body area and other areas may also be set for each of interactive objects included on the graphical user interface, so as to facilitate determination of whether to select the corresponding interactive object. Therefore, before the touch operation for the target interactive object is received, the method further includes:

setting, based on a size of an interactive object and/or a spatial relationship with other interactive objects, a buffer area along an edge of the interactive object; and determining a body area and other areas for the interactive object based on the buffer area.

Specifically, the interactive object may be all interactive objects included in the graphical user interface, or may be interactive objects that are densely arranged or small in size; and the size of the interactive object refers to a shape and size of the interactive object, and the spatial relationship with other interactive objects refers to a neighborhood relationship, in position, with other interactive objects. It should be noted that an invisible buffer area may be set near the edge of the interactive object, whether a buffer area is set for each interactive object, and a specific position and range of the buffer area may be set depending on the shape and size of the interactive object and/or the spatial relationship with other interactive objects.

In the present application, the buffer area may be set for the interactive object, so that even if the touch operation of the user does not fall exactly on the target interactive object, it can be determined whether to select the target interactive object based on the touch operation falling into the buffer area. In this way, an operational range for selecting the target interactive object is expanded, and a requirement for position precision of the touch operation, that is, the difficulty in selecting the target interactive object, is reduced, so that the user can select the desired interactive object more conveniently.

In an optional implementation of this embodiment, a specific implementation process of setting, based on a size of an interactive object and/or a spatial relationship with other interactive objects, a buffer area along an edge of the interactive object may be as follows:

when the size of the interactive object is a first size and the interactive object is adjacent to another interactive object of a second size, or when the size of the interactive object is the first size and the interactive object is not adjacent to another interactive object, setting the buffer area outside the edge of the interactive object, where the first size is less than the second size.

Specifically, the first size is a size less than a size threshold, and the second size is a size greater than the size threshold, where the size threshold may be preset. If the size of the interactive object is the first size, it indicates that the size of the interactive object is less than the size threshold, that is, the interactive object is smaller; and if the size of the interactive object is the second size, it indicates that the size of the interactive object is greater than the size threshold, that is, the interactive object is larger.

Figure 2:
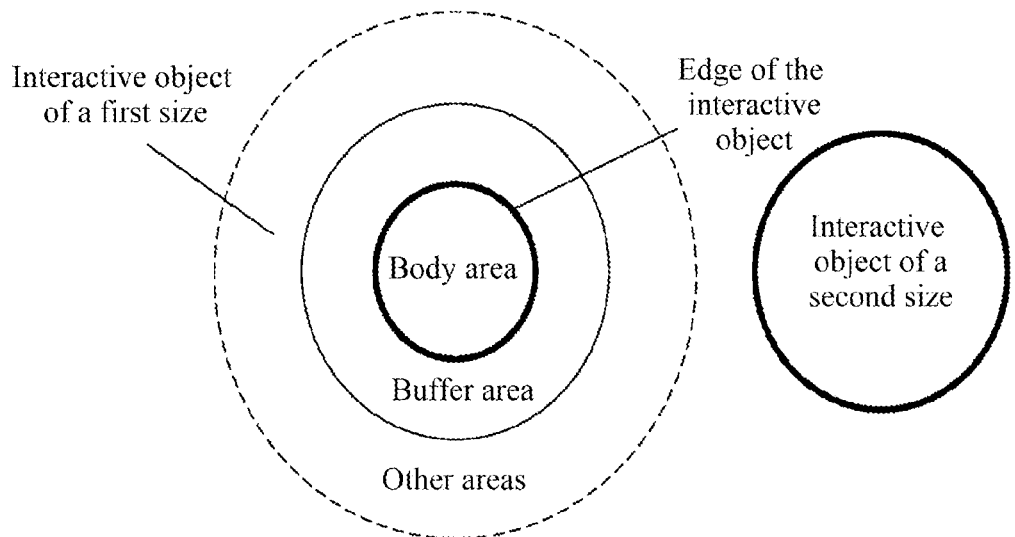
FIG. 2 is a schematic diagram of a buffer area of a first interactive object according to an embodiment of the present application.

Exemplarily, FIG. 2 is a schematic diagram of a buffer area of a first interactive object according to an embodiment of the present application. As shown in FIG. 2, the interactive object is of the first size and is adjacent to another interactive object of the second size, and taking a circular interactive object as an example, the buffer area is set outside the edge of the interactive object.

It should be noted that, if the size of the interactive object is the first size, it indicates that the interactive object is smaller; and if the interactive object is adjacent to another interactive object of the second size, it indicates that one smaller interactive object is adjacent to another larger interactive object. In order to facilitate a selection operation for the smaller interactive object by a user, an operational range for the smaller interactive object should be as wide as possible. Since it is a smaller area inside the edge of the smaller interactive object, in order to expand the operational range for selecting the interactive object (namely, to set a buffer area that facilitates an operation), the buffer area may be set outside the edge of the interactive object.

In addition, if the size of the interactive object is the first size, even if the interactive object is not adjacent to another interactive object, it is still a smaller area inside the edge of the smaller interactive object. In this case, in order to expand the operational range for selecting the smaller interactive object (namely, to set a buffer area that facilitates an operation), the buffer area should also be set outside the edge of the interactive object. In other words, in order to facilitate a touch operation, the buffer area should be set outside the edge of the smaller interactive object that is adjacent or not adjacent to another larger interactive object.

In an optional implementation of this embodiment, a specific implementation process of setting, based on a size of an interactive object and/or a spatial relationship with other interactive objects, a buffer area along an edge of the interactive object may be as follows:

when the size of the interactive object is a second size and the interactive object is adjacent to another interactive object of a first size, setting the buffer area inside the edge of the interactive object, where the first size is less than the second size.

It should be noted that, if the size of the interactive object is the second size, it indicates that the interactive object is larger; and if the interactive object is adjacent to another interactive object of the first size, it indicates that one larger interactive object is adjacent to another smaller interactive object. A wider buffer area does not need to be set for the larger interactive object since one larger interactive object itself is easier to operate. Moreover, if a buffer area is set outside the edge of the larger interactive object, the buffer area may overlap with a body area of the smaller interactive object adjacent to the larger interactive object, resulting in a misjudgment. Therefore, when a larger interactive object is adjacent to another smaller interactive object, a buffer area of the larger interactive object may be set inside the edge of the interactive object.

Figure 3:
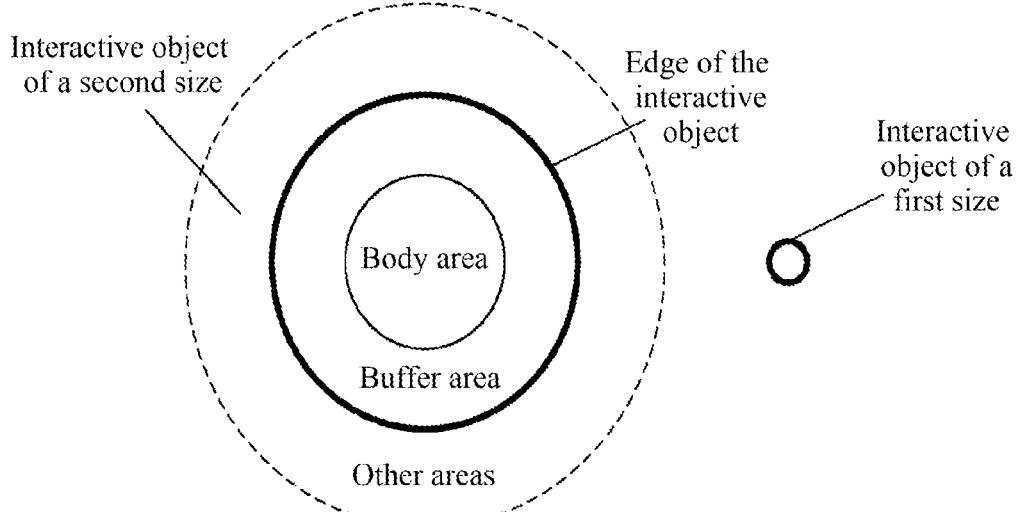
FIG. 3 is a schematic diagram of a buffer area of a second interactive object according to an embodiment of the present application.

Exemplarily, FIG. 3 is a schematic diagram of a buffer area of a second interactive object according to an embodiment of the present application. As shown in FIG. 3, the size of the interactive object is the second size and the interactive object is adjacent to another interactive object of the first size, and taking a circular interactive object as an example, the buffer area is set inside the edge of the interactive object.

In addition, when the size of the interactive object is the second size and the interactive object is not adjacent to another interactive object, the buffer area may not be set along the edge of the interactive object. In other words, a larger interactive object around which there are no other adjacent interactive objects is easier to operate, and other interactive objects are not easily accidentally touched. Therefore, the buffer area may not be set, and it may be determined whether to select the interactive object directly depending on whether a touch operation falls on the interactive object.

In an optional implementation of this embodiment, a specific implementation process of setting, based on a size of an interactive object and/or a spatial relationship with other interactive objects, a buffer area along an edge of the interactive object may be as follows:

when the size of the interactive object is a first size and the interactive object is adjacent to another interactive object of the first size, or when the size of the interactive object is a second size and the interactive object is adjacent to another interactive object of the second size, setting the buffer area both inside and outside the edge of the interactive object.

It should be noted that, the size of the interactive object is the first size and the interactive object is adjacent to another interactive object of the first size, which means that a smaller interactive object is adjacent to another smaller interactive object; and the size of the interactive object is the second size and the interactive object is adjacent to another interactive object of the second size, which means that a larger interactive object is adjacent to another larger interactive object. In other words, when a plurality of interactive objects of similar size are adjacent to each other, the buffer area may be set both inside and outside the edge of an interactive object.

Figure 4:
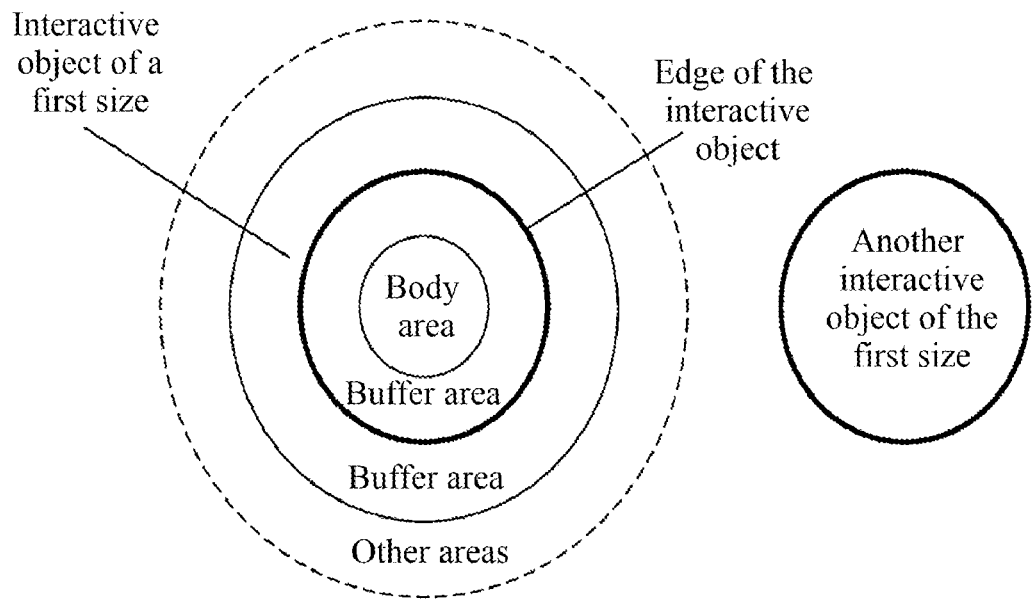
FIG. 4 is a schematic diagram of a buffer area of a third interactive object according to an embodiment of the present application.

Exemplarily, FIG. 4 is a schematic diagram of a buffer area of a third interactive object according to an embodiment of the present application. As shown in FIG. 4, the interactive object is of the first size and is adjacent to another interactive object of the first size, and taking a circular interactive object as an example, the buffer area is set both inside and outside the edge of the interactive object.

In the present application, the specific position and range of the buffer area can be set based on the shape and size of the interactive object and/or the spatial relationship with other interactive objects. Different buffer areas may be set for interactive objects of different sizes and with different spatial relationships, so as to adapt to changeable interactive object arrangement scenarios, and operational ranges for interactive objects of various sizes and position relationships are made as wide as possible, thereby facilitating selection of interactive objects of various different sizes by a user.

It should be noted that the shape of the interactive object is not limited in present application, which may be circular, rectangular, triangular, etc. The above description is made by taking a circular interactive object as an example.

In an optional implementation of this embodiment, a specific implementation process of setting a buffer area along an edge of the interactive object may be as follows:
setting the buffer area in a locality along the edge of the interactive object.

It should be noted that the buffer area may be set near each edge of the interactive object, or may be set near only an edge in some directions, that is, the locality along the edge of the interactive object may be around the edge, or may be in a direction of a certain locality.

Figure 5:
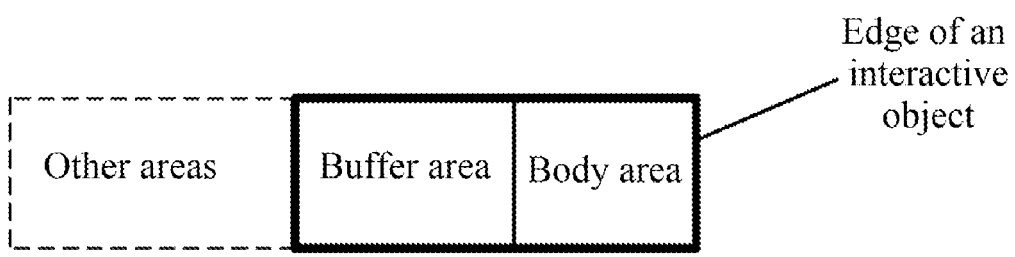
FIG. 5 is a schematic diagram of a buffer area of a fourth interactive object according to an embodiment of the present application.

Exemplarily, as shown in each of FIGS. 2 to 4, taking a circular interactive object as an example, the buffer area is set around the edge of the interactive object. FIG. 5 is a schematic diagram of a buffer area of a fourth interactive object according to an embodiment of the present application. As shown in FIG. 5, taking a rectangular interactive object as an example, the buffer area is set inside a left edge of the interactive object.

Further, an area range of the buffer area may be set based on terminal device attributes.

Specifically, the area range of the buffer area refers to a width of the buffer area; and the terminal device attributes may include a screen size, a touch-screen sensing precision, a mouse tracking speed, etc. It should be noted that the buffer area of a corresponding area range may be set based on the performance of a terminal, so as to adapt to terminals of different performances and ensure the simplicity and accuracy of a selection operation for an interactive object.

In addition, buffer areas of different interactive objects may overlap or even coincide with each other, but should be prevented from overlapping with body areas of other interactive objects, to avoid ambiguity in determination.

Figure 6:
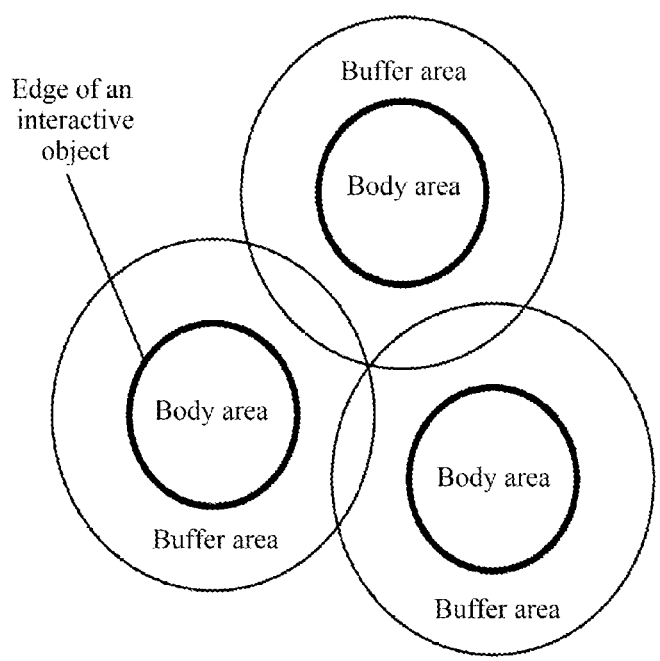
FIG. 6 is a schematic diagram of a buffer area of a fifth interactive object according to an embodiment of the present application.

Exemplarily, FIG. 6 is a schematic diagram of a buffer area of a fifth interactive object according to an embodiment of the present application. As shown in FIG. 6, taking a circular interactive object as an example, and taking the buffer area being set outside the edge of the interactive object as an example, there is an overlap between buffer areas of three interactive objects.

In an optional implementation of this embodiment, a specific implementation process of determining, after determining the buffer area for the interactive object, a body area and other areas for the interactive object based on the buffer area may be as follows:
determining an area inside the edge of the interactive object that is not the buffer area to be the body area of the interactive object; and
determining areas, other than the buffer area and the body area, to be the other areas.

Exemplarily, as shown in FIGS. 2 to 6, taking a circular or rectangular interactive object as an example, an area inside the edge of the interactive object that is not the buffer area is determined to be the body area of the interactive object, and areas, other than the buffer area and the body area, are determined to be the other areas.

In the present application, an interactive object and surrounding areas thereof can be divided into a body area, a buffer area and other areas. Therefore, it can be further determined whether to select a corresponding target interactive object depending on which area a touch operation of a user is located in, without controlling the touch operation to fall exactly on the target interactive object, which reduces a requirement for position precision of the touch operation, that is, the difficulty in selecting an interactive object, thereby allowing the user to more conveniently select an interactive object without accidental touch.

In an optional implementation of this embodiment, the range of the buffer area may also be adjusted based on an interactive history of a user, that is, after the buffer area is set along the edge of the interactive object, the method further includes:
adjusting an area range of the buffer area based on a historical touch operation.

Specifically, the historical touch operation includes a number of clicks on the buffer area, body area and other areas of the interactive object. It should be noted that, if the user frequently clicks on the buffer area, which indicates that the setting of the buffer area facilitates the usage by the user, the range of the buffer area may be widened correspondingly; and if the user frequently clicks on the body area, which indicate that the setting of the buffer area has little effect, the range of the buffer area may be narrowed down correspondingly. In this way, the range of the buffer area can be dynamically adjusted based on the interactive history, so that the setting of the buffer area can be adapted to the current user, thereby facilitating an operation of the user.

Step 104: A moving direction of the touch operation is detected in response to determining that the touch position is located in the buffer area preset for the target interactive object.

Specifically, on the basis of receiving a touch operation for the target interactive object and determining a touch position of the touch operation, when it is determined that the touch position is located in a buffer area preset for the target interactive object, the moving direction of the touch operation will be further detected.

Further, after the touch position of the touch operation is determined, the method further includes at least any one of:

determining to select the target interactive object when it is determined that the touch position is located in a body area preset for the target interactive object; and determining not to select the target interactive object when it is determined that the touch position is located in other areas preset for the target interactive object.

In the present application, it may be further determined whether to select the target interactive object depending on which area of the target interactive object the touch position falls into. If the touch position falls into the buffer area of the target interactive object, a pending status may be entered, and it is further determined whether to select the target interactive object based on the moving direction of the touch operation. If the touch position is located in the body area of the target interactive object, it indicates that the touch operation of the user falls exactly on the target interactive object. In this case, it is directly determined to select the target interactive object without requiring any determination. If the touch position is located in the other areas of the target interactive object, it indicates that the touch operation of the user is far away from the target interactive object, and there is a low probability that the user wants to select the target interactive object. In this case, it is directly determined not to select the target interactive object. This eliminates the need for the user to control the touch operation to fall exactly on the target interactive object, thereby reducing a requirement for position precision of the touch operation and thus the difficulty in selecting an interactive object.

Step 106: It is determined to select the target interactive object when the moving direction points toward a body area preset for the target interactive object.

Specifically, on the basis of detecting the moving direction of the touch operation, it is further determined to select the target interactive object when the moving direction points toward a body area preset for the target interactive object.

It should be noted that if it is detected that the touch position of the touch operation moves across a boundary between the buffer area and the body area of the target interactive object, it is determined that the moving direction of the touch operation is detected to point toward the body area of the target interactive object. In addition, once it is detected that the moving direction of the touch operation points toward the body area of the target interactive object, it indicates that the touch operation moves toward the target interactive object, and at this time, there is a high probability that the user wants to select this target interactive object, regardless of whether the touch operation finally stays in the body area of the target interactive object. In this case, it can be determined to select the target interactive object.

Further, after the moving direction of the touch operation is detected, the method further includes:

determining not to select the target interactive object when the moving direction points toward other areas preset for the target interactive object.

It should be noted that if it is detected that the touch position of the touch operation moves across a boundary between the buffer area and the other areas of the target interactive object, it is determined that the moving direction of the touch operation is detected to point toward the other areas of the target interactive object. In addition, if it is detected that the moving direction of the touch operation points toward the other areas of the target interactive object, it indicates that the touch operation is far away from the target interactive object, and at this time, there is a high probability that the user does not want to select the target interactive object. It can be directly determined not to select the target interactive object.

Further, after the moving direction of the touch operation is detected, the method further includes:

when no moving direction of the touch operation is detected, determining to select the target interactive object if the touch position of the touch operation is located inside the edge of the interactive object; and determining not to select the target interactive object if the touch position of the touch operation is located outside the edge of the interactive object.

During specific implementation, if it is detected that the user performs a sliding operation based on the touch operation, a sliding trajectory of the sliding operation is the moving direction of the touch operation; and if it is detected that the user directly lifts up after performing the touch operation, it is determined that no moving direction of the touch operation is detected.

It should be noted that when it is determined that the touch position is located in the buffer area of the target interactive object, the moving direction of the touch operation is further detected. If the moving direction of the touch operation is detected, it can be further determined whether to select a corresponding target interactive object based on the moving direction. However, if no moving direction of the touch operation is detected, it indicates that after performing the touch operation, the user directly lifts up, instead of performing a moving operation. In this case, it can be determined whether to select the target interactive object depending on whether the touch operation is located inside the edge of the target interactive object.

According to the interactive object selection method provided in the present application, the buffer area, the body area, and the other areas are preset for the target interactive object. If the touch position is located in the body area of the target interactive object, it can be directly determined to select the target interactive object; if the touch position is located in the other areas of the target interactive object, it is directly determined not to select the target interactive object; and if the touch position is located in the buffer area of the target interactive object, it can be further determined whether to select the target interactive object based on the moving direction of the touch operation. As such, when a user wants to select a target interactive object, the user can control a touch operation to fall into a buffer area of the target interactive object, in addition to directly on a body area of the target interactive object, and to move toward the body area of the target interactive object, which reduces a requirement for position precision of the touch operation and thus a difficulty in selecting an interactive object, thereby allowing the user to more conveniently select an interactive object without accidental touch.

Figure 7:
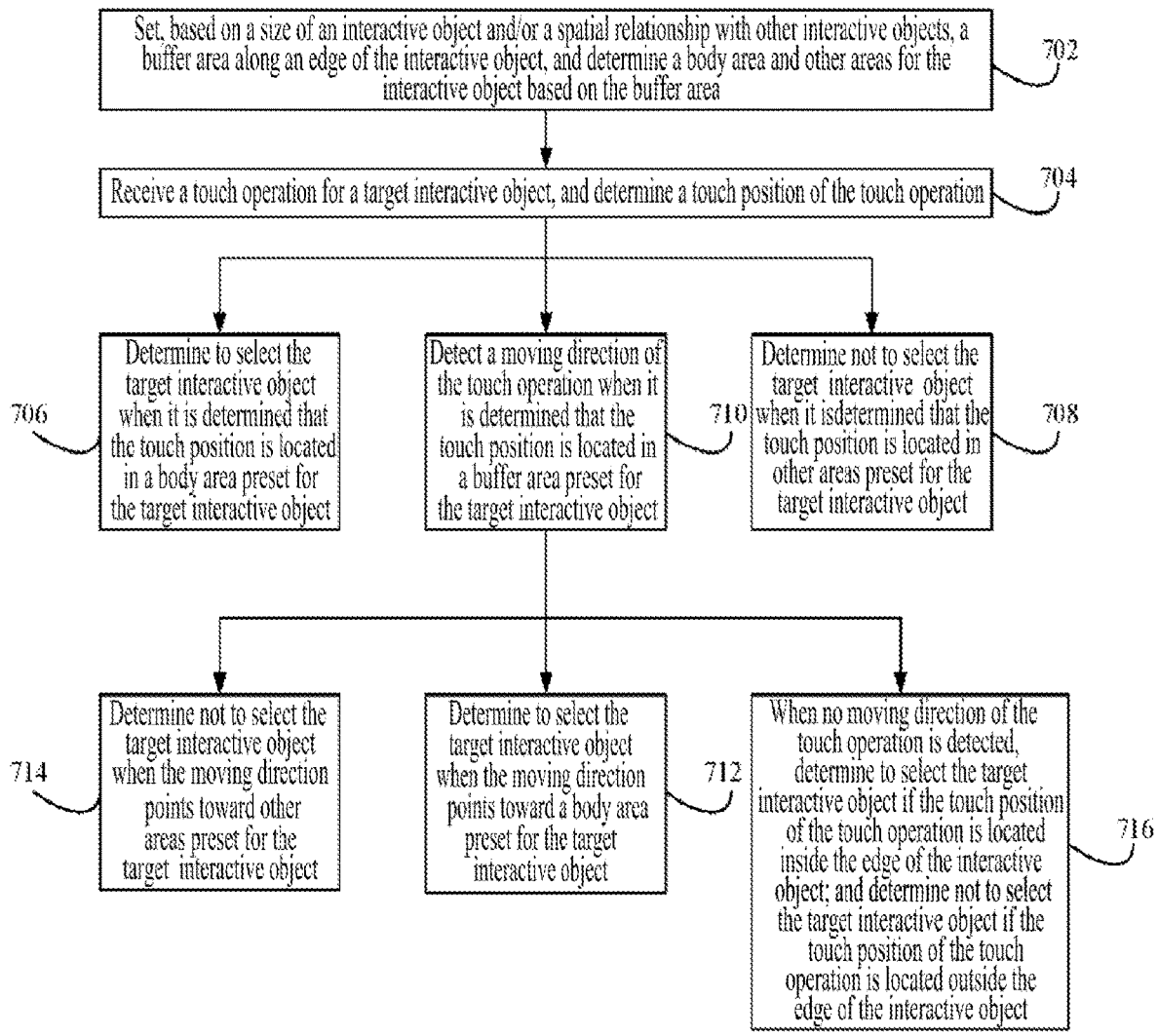
FIG. 7 is a flowchart of another interactive object selection method according to an embodiment of the present application.

FIG. 7 is a flowchart of another interactive object selection method according to an embodiment of the present application. As shown in FIG. 7, the method specifically includes the following steps.

Step 702: Based on a size of an interactive object and/or a spatial relationship with other interactive objects, a buffer area is set along an edge of the interactive object, and a body area and other areas are determined for the interactive object based on the buffer area.

During specific implementation, when the size of the interactive object is a first size and the interactive object is adjacent to another interactive object of a second size, or when the size of the interactive object is the first size and the interactive object is not adjacent to another interactive object, the buffer area is set outside the edge of the interactive object;

when the size of the interactive object is a second size and the interactive object is adjacent to another interactive object of a first size, the buffer area is set inside the edge of the interactive object; and when the size of the interactive object is a first size and the interactive object is adjacent to another interactive object of the first size, or when the size of the interactive object is a second size and the interactive object is adjacent to another interactive object of the second size, the buffer area is set both inside and outside the edge of the interactive object. The first size is less than the second size.

Step 704: A touch operation for a target interactive object is received, and a touch position of the touch operation is determined.

Step 706: It is determined to select the target interactive object when it is determined that the touch position is located in a body area preset for the target interactive object.

Step 708: It is determined not to select the target interactive object when it is determined that the touch position is located in other areas preset for the target interactive object.

Step 710: A moving direction of the touch operation is detected when it is determined that the touch position is located in a buffer area preset for the target interactive object.

Step 712: It is determined to select the target interactive object when the moving direction points toward a body area preset for the target interactive object.

Step 714: It is determined not to select the target interactive object when the moving direction points toward other areas preset for the target interactive object.

Step 716: When no moving direction of the touch operation is detected, it is determined to select the target interactive object if the touch position of the touch operation is located inside the edge of the interactive object; and it is determined not to select the target interactive object if the touch position of the touch operation is located outside the edge of the interactive object.

According to the interactive object selection method provided in the embodiment of the present application, the buffer area, the body area, and the other areas are preset for the target interactive object. If the touch position is located in the body area of the target interactive object, it can be directly determined to select the target interactive object; if the touch position is located in the other areas of the target interactive object, it is directly determined not to select the target interactive object; and if the touch position is located in the buffer area of the target interactive object, it can be further determined whether to select the target interactive object based on the moving direction of the touch operation. As such, when a user wants to select a target interactive object, the user can control a touch operation to fall into a buffer area of the target interactive object, in addition to directly on a body area of the target interactive object, and to move toward the body area of the target interactive object, which reduces a requirement for position precision of the touch operation and thus a difficulty in selecting an interactive object, thereby allowing the user to more conveniently select an interactive object without accidental touch.

Figure 8:
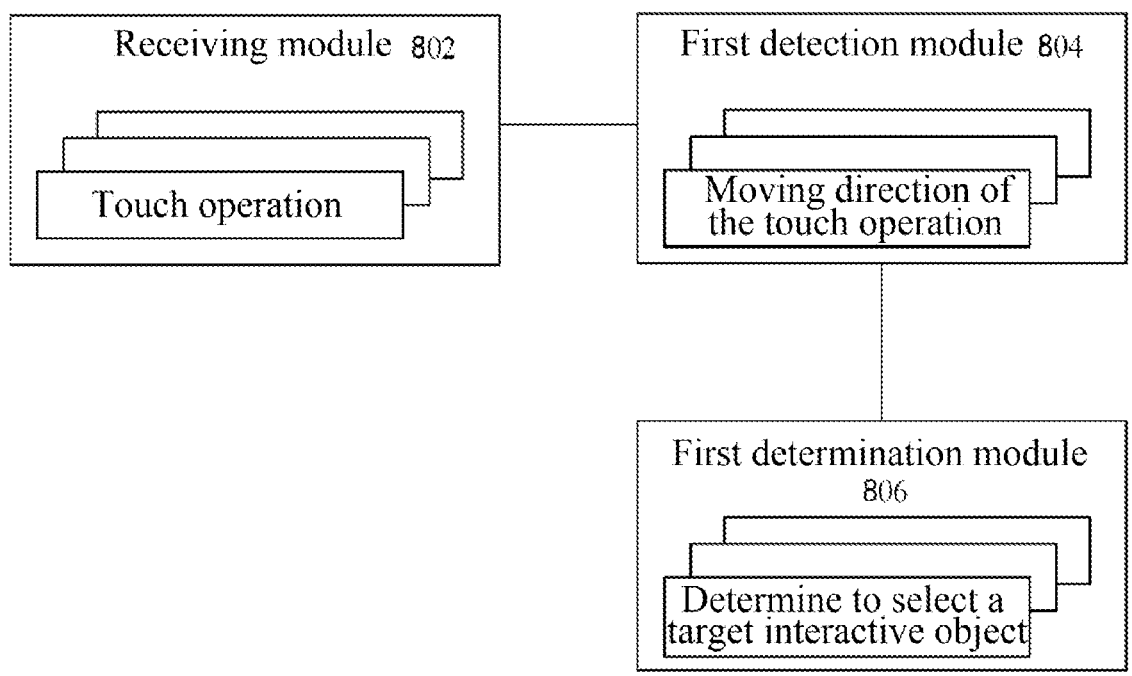
FIG. 8 is a schematic structural diagram of an interactive object selection apparatus according to an embodiment of the present application.

Corresponding to the foregoing method embodiment, the present application further provides an embodiment of an interactive object selection apparatus. FIG. 8 is a schematic structural diagram of an interactive object selection apparatus according to an embodiment of the present application. As shown in FIG. 8, the apparatus includes:

a receiving module 802 configured to receive a touch operation for a target interactive object, and determine a touch position of the touch operation;

a first detection module 804 configured to detect a moving direction of the touch operation when it is determined that the touch position is located in a buffer area preset for the target interactive object; and a first determination module 806 configured to determine to select the target interactive object when the moving direction points toward a body area preset for the target interactive object.

Optionally, the apparatus further includes:

a setting module configured to set, based on a size of an interactive object and/or a spatial relationship with other interactive objects, a buffer area along an edge of the interactive object; and a second determination module configured to determine a body area and other areas for the interactive object based on the buffer area.

Optionally, the setting module is further configured to:

when the size of the interactive object is a first size and the interactive object is adjacent to another interactive object of a second size, or when the size of the interactive object is the first size and the interactive object is not adjacent to another interactive object, set the buffer area outside the edge of the interactive object, where the first size is less than the second size.

Optionally, the setting module is further configured to:

when the size of the interactive object is a second size and the interactive object is adjacent to another interactive object of a first size, set the buffer area inside the edge of the interactive object, where the first size is less than the second size.

Optionally, the setting module is further configured to:

when the size of the interactive object is a first size and the interactive object is adjacent to another interactive object of the first size, or when the size of the interactive object is a second size and the interactive object is adjacent to another interactive object of the second size, set the buffer area both inside and outside the edge of the interactive object.

Optionally, the second determination module is further configured to:

determine an area inside the edge of the interactive object that is not the buffer area to be the body area of the interactive object; and determine areas, other than the buffer area and the body area, to be the other areas.

Optionally, the apparatus further includes at least any one of:

a third determination module configured to determine to select the target interactive object when it is determined that the touch position is located in a body area preset for the target interactive object;

a fourth determination module configured to determine not to select the target interactive object when it is determined that the touch position is located in other areas preset for the target interactive object; and a fifth determination module configured to determine not to select the target interactive object when the moving direction points toward other areas preset for the target interactive object.

Optionally, the apparatus further includes:

a sixth determination module configured to: when no moving direction of the touch operation is detected, determine to select the target interactive object if the touch position of the touch operation is located inside the edge of the interactive object; and determine not to select the target interactive object if the touch position of the touch operation is located outside the edge of the interactive object.

Optionally, an area range of the buffer area is set based on terminal device attributes.

Optionally, the apparatus further includes:

an adjustment module configured to adjust the area range of the buffer area based on a historical touch operation.

Optionally, the setting module is further configured to:

set the buffer area in a locality along the edge of the interactive object.

According to the interactive object selection apparatus provided in the embodiment of the present application, the buffer area, the body area, and the other areas are preset for the target interactive object. If the touch position is located in the body area of the target interactive object, it can be directly determined to select the target interactive object; if the touch position is located in the other areas of the target interactive object, it is directly determined not to select the target interactive object; and if the touch position is located in the buffer area of the target interactive object, it can be further determined whether to select the target interactive object based on the moving direction of the touch operation. As such, when a user wants to select a target interactive object, the user can control a touch operation to fall into a buffer area of the target interactive object, in addition to directly on a body area of the target interactive object, and to move toward the body area of the target interactive object, which reduces a requirement for position precision of the touch operation and thus a difficulty in selecting an interactive object, thereby allowing the user to more conveniently select an interactive object without accidental touch.

The foregoing description is a schematic solution of the interactive object selection apparatus of this embodiment. It should be noted that the technical solution of the interactive object selection apparatus belongs to the same concept as the technical solution of the foregoing interactive object selection method. For details that are not further described in the technical solution of the interactive object selection apparatus, reference may be made to the description of the technical solution of the foregoing interactive object selection method.

Figure 9:
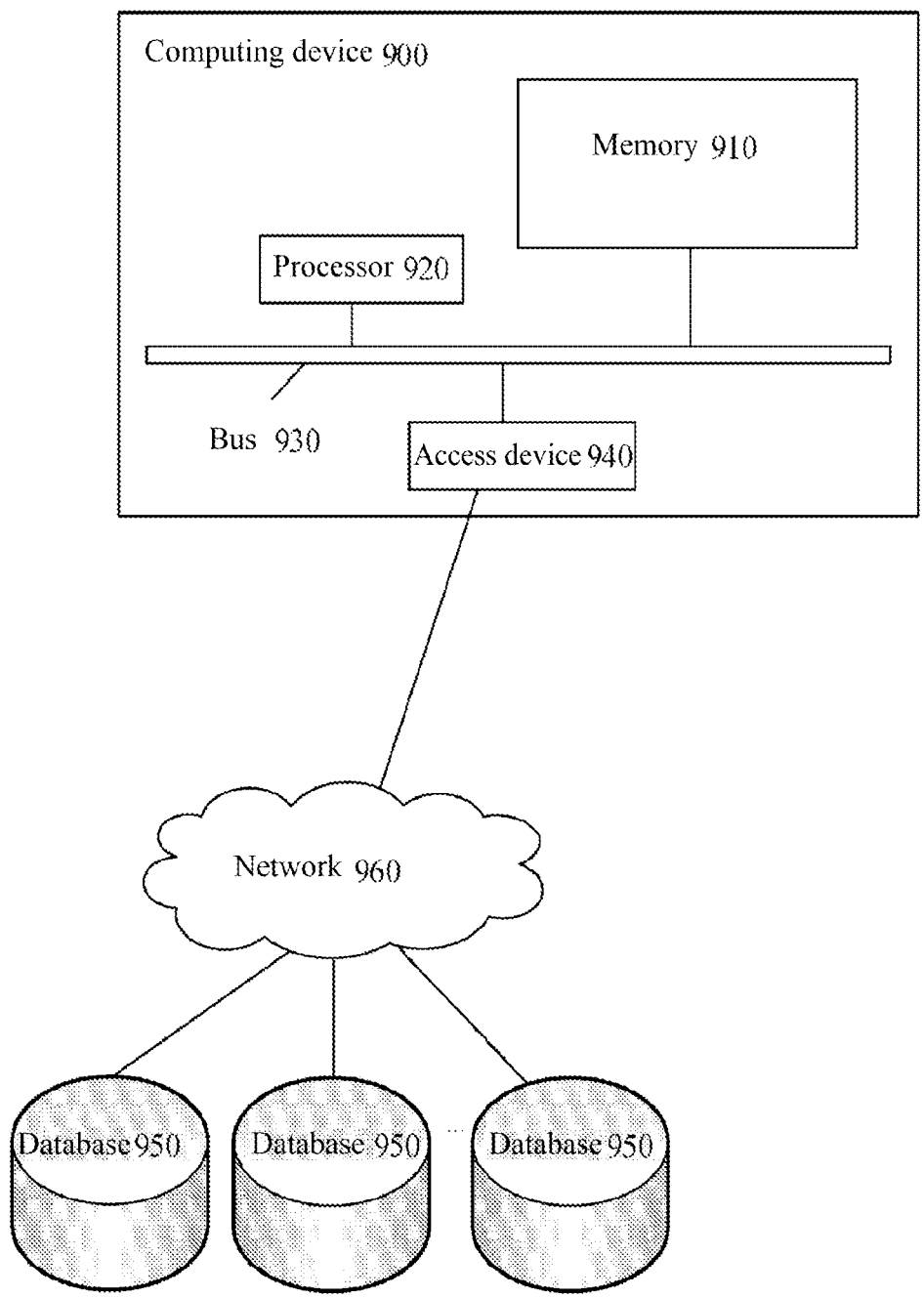
FIG. 9 is a structural block diagram of a computing device according to an embodiment of the present application.

FIG. 9 is a structural block diagram of a computing device 900 according to an embodiment of the present application. Components of the computing device 900 include, but are not limited to, a memory 910 and a processor 920. The processor 920 is connected to the memory 910 through a bus 930, and a database 950 is configured to store data.

The computing device 900 further includes an access device 940. The access device 940 enables communication of the computing device 900 via one or more networks 960. Examples of the networks include a public switched telephone network (PSTN), a local area network (LAN), a wide area network (WAN), a personal area network (PAN), or a combination of communication networks such as the Internet. The access device 940 may include one or more of any types of wired or wireless network interface (e.g., network interface card (NIC)), such as an IEEE 802.11 wireless local area network (WLAN) wireless interface, a worldwide interoperability for microwave access (Wi-MAX) interface, an Ethernet interface, a universal serial bus (USB) interface, a cellular network interface, a Bluetooth interface, and a near-field communication (NFC) interface.

In an embodiment of the present application, the foregoing components of the computing device 900 and other components not shown in FIG. 9 may also be connected to each other, e.g., through a bus. It should be understood that the structural block diagram of the computing device shown in FIG. 9 is merely an example, instead of limiting the scope of the present application. Those skilled in the art can add or replace other components as required.

The computing device 900 may be any type of stationary or mobile computing device, including a mobile computer or a mobile computing device (e.g., a tablet computer, a personal digital assistant, a laptop computer, a notebook computer, a netbook, etc.), a mobile phone (e.g., a smartphone), a wearable computing device (e.g., a smart watch, smart glasses, etc.), or other types of mobile devices, or a stationary computing device such as a desktop computer or a PC. The computing device 900 may alternatively be a mobile or stationary server.

The processor 920 is configured to execute the following computer-executable instructions to implement the steps of the interactive object selection method.

The foregoing description is a schematic solution of the computing device of this embodiment. It should be noted that the technical solution of the computing device belongs to the same concept as the technical solution of the foregoing interactive object selection method. For details that are not further described in the technical solution of the computing device, reference may be made to the description of the technical solution of the foregoing interactive object selection method.

An embodiment of the present application further provides a computer-readable storage medium storing computer instructions. When the computer instructions are executed by a processor, the steps of the interactive object selection method are implemented.

The foregoing description is a schematic solution of the computer-readable storage medium of this embodiment. It should be noted that the technical solution of the storage medium belongs to the same concept as the technical solution of the foregoing interactive object selection method. For details that are not further described in the technical solution of the storage medium, reference may be made to the description of the technical solution of the foregoing interactive object selection method.

An embodiment of the present application further provides a computer program product that, when executed in a computer, causes the computer to execute the steps of any of the foregoing interactive object selection methods.

The foregoing description is a schematic solution of the computer program product of this embodiment. It should be noted that the technical solution of the computer program product belongs to the same concept as the technical solution of the foregoing interactive object selection method. For details that are not further described in the technical solution of the computer program product, reference may be made to the description of the technical solution of the foregoing interactive object selection method.

Specific embodiments of the present application are described above. Other embodiments are within the scope of the appended claims. In some cases, the actions or steps recited in the claims can be performed in an order different from that in the embodiments, and can still achieve desired results. In addition, the processes depicted in the figures are not necessarily required to be shown in a particular or sequential order, to achieve desired results. In some implementations, multi-task processing and parallel processing are also possible or may be advantageous.

The computer-executable instructions include computer program code, which may be in a source code form, an object code form, an executable file form, some intermediate forms, etc. The computer-readable storage medium may include: any entity or apparatus that can carry the computer program code, such as a recording medium, a USB flash drive, a removable hard disk, a magnetic disk, an optical disc, a computer memory, a read-only memory (ROM), a random access memory (RAM), an electrical carrier signal, a telecommunications signal, and a software distribution medium. It should be noted that the content included in the computer-readable storage medium can be appropriately added or deleted depending on requirements of the legislation and patent practice in a jurisdiction. For example, in some jurisdictions, according to the legislation and patent practice, the computer-readable storage medium does not include an electrical carrier signal and a telecommunications signal.

It should be noted that, for ease of description, the foregoing method embodiments are described as a series of action combinations. However, persons skilled in the art should understand that the present application is not limited to the described action order, because according to the present application, some steps may be performed in another order or simultaneously. Moreover, those skilled in the art should also understand that the embodiments described in the present application are all preferred embodiments, and the involved actions and modules are not necessarily required by the present application.

In the foregoing embodiments, the embodiments are described with different emphases, and for a part which is not detailed in an embodiment, reference can be made to the related description of the other embodiments.

The preferred embodiments of the present application disclosed above are merely provided to help illustrate the present application. Optional embodiments are not intended to exhaust all details, nor do they limit the invention to only the described specific implementations. Apparently, many modifications and variations may be made in light of the content of the present application. In the present application, these embodiments are selected and specifically described to provide a better explanation of the principles and practical applications of the present application, so that those skilled in the art can well understand and utilize the present application. The present application should be defined only by the claims, and the full scope and equivalents thereof.

What is claimed is:

1. An interactive object selection method, comprising:
   receiving a touch operation intended for a target interactive object, and determining a touch position of the touch operation;
   detecting a moving direction of the touch operation in response to determining that the touch position is located in a buffer area preset for the target interactive object; and
   determining to select the target interactive object in response to determining that the moving direction points toward a body area preset for the target interactive object.

2. The interactive object selection method according to claim 1, wherein before the receiving a touch operation intended for a target interactive object, the method further comprises:
   setting, based on a size of an interactive object and a spatial relationship with other interactive objects, a buffer area in proximity to an edge of the interactive object; and
   determining a body area and other areas for the interactive object based on the buffer area.

3. The interactive object selection method according to claim 2, wherein the setting, based on a size of an interactive object and a spatial relationship with other interactive objects, a buffer area in proximity to an edge of the interactive object comprises:
   setting the buffer area outside the edge of the interactive object in response to determining that the size of the interactive object is the first size and the interactive object is not adjacent to another interactive object or in response to determining that the size of the interactive object is a first size and the interactive object is adjacent to another interactive object with a second size, wherein the first size is less than the second size.

4. The interactive object selection method according to claim 2, wherein the setting, based on a size of an interactive object and a spatial relationship with other interactive objects, a buffer area in proximity to an edge of the interactive object comprises:
   setting the buffer area inside the edge of the interactive object in response to determining that the size of the interactive object is a second size and the interactive object is adjacent to another interactive object with a first size, wherein the first size is less than the second size.

5. The interactive object selection method according to claim 2, wherein the setting, based on a size of an interactive object and a spatial relationship with other interactive objects, a buffer area in proximity to an edge of the interactive object comprises:
   setting the buffer area both inside and outside the edge of the interactive object in response to the size of the interactive object is a first size and the interactive object is adjacent to another interactive object with the first size or in response to determining that the size of the interactive object is a second size and the interactive object is adjacent to another interactive object with the second size.

6. The interactive object selection method according to claim 2, wherein the determining a body area and other areas for the interactive object based on the buffer area comprises:
   determining an area inside the edge of the interactive object that is not the buffer area to be the body area of the interactive object; and
   determining areas, other than the buffer area and the body area, to be the other areas.

7. The interactive object selection method according to claim 1, wherein after the determining a touch position of the touch operation, the method further comprises at least any one of:
   determining to select the target interactive object in response to determining that the touch position is located in a body area preset for the target interactive object;
   determining not to select the target interactive object in response to determining that the touch position is located in other areas preset for the target interactive object; and determining not to select the target interactive object in response to determining that the moving direction points toward the other areas preset for the target interactive object.

8. The interactive object selection method according to claim 1, wherein an area range of the buffer area is set based on attributes of a terminal device.

9. The interactive object selection method according to claim 1, further comprising:
adjusting an area range of the buffer area based on a historical touch operation.

10. A computing device, comprising:
a memory and a processor,
wherein the memory is configured to store computer-executable instructions, and the processor is configured to execute the computer-executable instructions to implement operations comprising:
receiving a touch operation intended for a target interactive object, and determining a touch position of the touch operation,
detecting a moving direction of the touch operation in response to determining that the touch position is located in a buffer area preset for the target interactive object; and
determining to select the target interactive object in response to determining that the moving direction points toward a body area preset for the target interactive object.

11. The computing device according to claim 10, wherein before the receiving a touch operation intended for a target interactive object, the operations further comprise:
setting, based on a size of an interactive object and a spatial relationship with other interactive objects, a buffer area in proximity to an edge of the interactive object; and
determining a body area and other areas for the interactive object based on the buffer area.

12. The computing device according to claim 11, wherein the setting, based on a size of an interactive object and a spatial relationship with other interactive objects, a buffer area in proximity to an edge of the interactive object comprises:
setting the buffer area outside the edge of the interactive object in response to determining that the size of the interactive object is the first size and the interactive object is not adjacent to another interactive object or in response to determining that the size of the interactive object is a first size and the interactive object is adjacent to another interactive object with a second size, wherein the first size is less than the second size.

13. The computing device according to claim 11, wherein the setting, based on a size of an interactive object and a spatial relationship with other interactive objects, a buffer area in proximity to an edge of the interactive object comprises:
setting the buffer area inside the edge of the interactive object in response to determining that the size of the interactive object is a second size and the interactive object is adjacent to another interactive object with a first size, wherein the first size is less than the second size.

14. The computing device according to claim 11, wherein the setting, based on a size of an interactive object and a spatial relationship with other interactive objects, a buffer area in proximity to an edge of the interactive object comprises:
setting the buffer area both inside and outside the edge of the interactive object in response to the size of the interactive object is a first size and the interactive object is adjacent to another interactive object with the first size or in response to determining that the size of the interactive object is a second size and the interactive object is adjacent to another interactive object with the second size.

15. The computing device according to claim 11, wherein the determining a body area and other areas for the interactive object based on the buffer area comprises:
determining an area inside the edge of the interactive object that is not the buffer area to be the body area of the interactive object; and
determining areas, other than the buffer area and the body area, to be the other areas.

16. The computing device according to claim 10, the operations further comprising:
setting an area range of the buffer area based on attributes of the computing device.

17. The computing device according to claim 10, the operations further comprising:
adjusting an area range of the buffer area based on a historical touch operation.

18. A non-transitory computer-readable storage medium, storing computer instructions, wherein the instructions upon execution by a processor cause the processor to implement operations comprising:
receiving a touch operation intended for a target interactive object, and determining a touch position of the touch operation,
detecting a moving direction of the touch operation in response to determining that the touch position is located in a buffer area preset for the target interactive object; and
determining to select the target interactive object in response to determining that the moving direction points toward a body area preset for the target interactive object.

19. The non-transitory computer-readable storage medium according to claim 18, wherein before the receiving a touch operation intended for a target interactive object, the operations further comprise:
setting, based on a size of an interactive object and a spatial relationship with other interactive objects, a buffer area in proximity to an edge of the interactive object; and
determining a body area and other areas for the interactive object based on the buffer area.

20. The non-transitory computer-readable storage medium according to claim 18, the operations further comprising:
adjusting an area range of the buffer area based on a historical touch operation.

* * * * *